United States Patent

Eberhart et al.

[11] Patent Number: 6,148,947
[45] Date of Patent: Nov. 21, 2000

[54] POWER ASSISTED STEERING UNIT FOR MOTOR VEHICLES

[75] Inventors: Eugen Eberhart; Lars Hampe, both of Düsseldorf, Germany

[73] Assignee: TRW Fahrwerksysteme GmbH & Co. KG, Dusseldorf, Germany

[21] Appl. No.: 09/170,658

[22] Filed: Oct. 13, 1998

[30] Foreign Application Priority Data

Oct. 17, 1997 [DE] Germany ............................ 197 45 897

[51] Int. Cl.$^7$ ........................................................ B62D 5/06
[52] U.S. Cl. ............................ 180/441; 180/422; 91/437
[58] Field of Search .................................. 180/441, 421, 180/422, 423; 91/437, 438, 439, 375 R, 375 A

[56] References Cited

U.S. PATENT DOCUMENTS

| | | | |
|---|---|---|---|
| 4,513,835 | 4/1985 | Fukino et al. .......................... | 180/422 |
| 4,830,131 | 5/1989 | Miyoshi et al. ........................ | 180/423 |
| 5,121,807 | 6/1992 | Adams .................................... | 180/423 |
| 5,152,359 | 10/1992 | Emori et al. ............................ | 180/422 |
| 5,452,642 | 9/1995 | Dymond ................................ | 91/375 R |
| 5,755,300 | 5/1998 | Lee et al. ................................ | 180/421 |

FOREIGN PATENT DOCUMENTS

| | | |
|---|---|---|
| 0430417 | 6/1991 | European Pat. Off. . |
| 3802917 | 8/1988 | Germany . |
| 19626060 | 1/1997 | Germany . |

*Primary Examiner*—Kevin Hurley
*Attorney, Agent, or Firm*—Tarolli, Sundheim, Covell, Tummino & Szabo L.L.P.

[57] ABSTRACT

To provide a particularly simple and cost effective design of a power-assisted steering unit for motor vehicles for supplying a servo-cylinder (3) with a hydraulic fluid as a function of the travelling speed and the steering rate, comprising a steering valve (1) by means of which the left and right chambers (16, 17) of the servo-cylinder (3) can be pressurized with hydraulic fluid via a pump (2) when there is a steering movement, and a bypass valve (10) connected in parallel to the servo-cylinder (3), by means of which a portion of the hydraulic fluid for pressurizing the servo-cylinder (3) that is directed past the servo-cylinder (3) is controlled, a throttling unit (26) is connected in series with the bypass valve (10). The hydraulic fluid inflow or return flow of the servo-cylinder (3) flows through this throttling unit (26) depending on the steering direction. The throttling unit (26) automatically throttles the flow of hydraulic fluid that is directed through the bypass valve (10) starting from a predetermined value of such volume flow.

Furthermore defined is an assisted-power unit for motor vehicles for supplying hydraulic fluids to a servo-cylinder (3) as a function of the travelling speed, wherein the bypass valve (10) is designed as a proportional valve to achieve a particularly compact and cost effective form of construction.

14 Claims, 5 Drawing Sheets

POWER ASSISTED STEERING UNIT FOR MOTOR VEHICLES

The invention relates to a power-assisted steering unit for motor vehicles for the supply of hydraulic fluids to a servo-cylinder as a function of the vehicle speed, having a steering valve by which left and right chambers of the servo-cylinder may be pressurized with hydraulic fluid via a pump when there is a steering motion and a bypass valve connected in parallel to the servo-cylinder by which a portion of the hydraulic fluid for pressurizing the servo-cylinder, which is directed past the servo-cylinder, may be controlled.

Generic power-assisted steering units are known per se. In these units, the steering valve comprises an input shaft connected with a steering rod. A torque rod connects the input shaft with an output shaft provided with a pinion. The pinion acts on the rack of a steering assembly. The output shaft is non-rotatably connected with a valve sleeve that surrounds the input shaft. If the input shaft is twisted relative to the valve sleeve, the hydraulic fluid provided via the pump is supplied to one of the two chambers of the servo-cylinder that supports the motion of the steering rack in the corresponding direction.

Less servo-assistance is desired at high travelling speed than during parking or slow travel. Thus, at high travelling speeds, a portion of the hydraulic fluid pressurizing the servo-cylinder is directed through a bypass such that the volume flow in the servo-cylinder that causes servo assistance is reduced. The bypass valve controls the volume flow through the bypass so as to permit the passage of a minimum hydraulic fluid flow at low travelling speeds and a maximum flow at high travelling speeds so that the servo-cylinder is subject to maximum or minimum pressurization by hydraulic fluid.

In prior art it is known to design the bypass valve as an axial slide valve that is driven by an electric stepping motor responding to a travelling speed sensor. A disadvantage, however, is that the design-dependent overall dimensions of the stepping motor and the axial slide valve require the construction of a separate subassembly. Furthermore, the housing of the axial slide valve must be made of steel to prevent jamming of the slider and leaking. This bulky and heavy design causes high production costs. A further disadvantage is the fact that the stepping motor has a limited rate of response such that very rapid changes in the magnetic current supply are inadequately converted. Finally, it is also disadvantageous to use a separate return flow connection to a hydraulic reservoir since this represents additional production costs.

The object of the invention is to further develop an assisted-power steering unit for motor vehicles of the initially described type, which avoids the described disadvantages and permits a more cost-effective and simpler production while simultaneously reducing the overall dimensions.

The invention attains this object by designing the bypass valve as a proportional valve.

The embodiment according to the invention permits simple and cost effective production of the power-assisted steering unit. Furthermore, it provides a very short response time to changes in the speed-dependent magnetic current supply so that changes in the travelling speed may be adequately taken into account. The primary reason for this is that a proportional valve produces an analog conversion of an electrical signal into a hydraulic variable while magnet actuated transfer valves or stepping motors assume only discrete switching positions. For this purpose, the magnetic force determined by the value of the feed current is weighed against the effect of the hydraulic pressure to produce proportionality between electric input variable and hydraulic output pressure. Since feedback of the changed hydraulic variables is not required, a separate return connection to the hydraulic reservoir can also be eliminated.

In a preferred embodiment, the proportional valve is integrated in the housing of the steering valve to achieve a compact and cost effective design.

It is particularly advantageous if the bypass valve is provided with a slider that is spring loaded in axial direction to permit a predefined position of the slider.

Advantageously, the bypass valve comprises a cylindrical chamber provided with at least one axial and at least one radial opening, in which the slider is guided in such a way that the flow of hydraulic fluid through the bypass valve, depending on the steering direction, enters, respectively exits, through at least one radial opening in the bypass valve and flows out of, respectively into, at least one axial opening. This has the advantage of rapidly and efficiently throttling the volume flow passing through the bypass valve with the smallest possible displacement movements of the slider of the bypass valve.

Advantageously, the slider may be moved as a function of the travelling speed to provide speed-dependent throttling.

It is furthermore known in prior art to control the flow of hydraulic fluid for one of the initially described assisted-power steering units not only as a function of the travelling speed but also to take into account the existing steering rate. The primary reason for this is that for certain steering maneuvers at high travelling speeds, the non-existent or low servo-assistance is inadequate. Steering situations may occur at high travelling speeds that require a rapid and high steering input torque, for example, in the case of an evasive maneuver at high speed. To provide servo-assistance in such dangerous situations, there are known generic-type power-assisted steering units for motor vehicles that supply a servo-cylinder with hydraulic fluid as a function of the travelling speed and the steering rate.

EP 0 430 417 B1 discloses a vehicle power-assisted steering system comprising a piston actuated by fluid pressure with chambers facing each other, a steering valve and a fluid flow connection establishing a bypass between these opposite chambers. A bypass valve is disposed in the bypass, which increases the fluid flow through the bypass if the travelling speed is increased and reduces the fluid flow through the bypass valve if the travelling speed is decreased. Furthermore, at a predetermined fluid pressure differential between the chambers lying opposite each other, the volume flow through the bypass is throttled independently of the momentary travelling speed in order to obtain high servo assistance.

For this purpose, the bypass valve comprises a first valve unit, which reacts as a function of the travelling speed, and a second valve unit, which is connected in parallel to this first valve unit and uses the pressure difference between the two opposite chambers to control the first valve unit. The first valve unit comprises an axial slide valve, which is driven by an electric stepping motor and throttles the volume flow through the bypass valve as a function of the travelling speed. The second valve unit comprises two coaxially aligned cylindrical pressure chambers, which are respectively hydraulically connected with one of the two opposite chambers of the servo-cylinder, so that the pressure difference in the servo-cylinder is reflected by a piston element that is arranged between the two cylindrical chambers and is axially displaceable coaxially between these chambers. When a predetermined pressure differential adjusted by spring elements engaging with the piston element is reached, the piston element is displaced in such a way that a volume flow can flow from the cylindrical chamber with the higher pressure to the first valve unit to move this unit into a throttling position.

This makes it possible, when a predetermined pressure difference is reached, to provide servo-assistance to the servo-cylinder even at high speeds by throttling the bypass valve such that high servo-assistance is provided. This exploits the effect that a strong steering input torque accompanies a high pressure difference in the servo-cylinder. A disadvantage of this known power-assisted steering system for vehicles is that the design is relatively complex which makes production costly. A further disadvantage is the fact that the power-assisted steering system is very susceptible to wear due to the many components and sealing surfaces that may cause jamming of the axially displaced parts and leaking.

Thus, it is an additional object of the invention to further develop a power-assisted steering unit of the initially described type so as to control the volume flow through the bypass as a function of the steering rate by means of a simpler and more cost effective design.

To attain this object, the invention proposes to connect in series with the bypass valve a throttling unit through which the inflow or return flow of hydraulic fluid of the servo-cylinder flows, depending on the steering direction, and which automatically throttles the flow of hydraulic fluid directed through the bypass valve starting from a predetermined quantity of this volume flow.

The invention is based on the knowledge that the steering volume flow provided by the steering valve is proportional to the steering rate. Accordingly, the automatic throttling by the throttling unit of the flow of hydraulic fluid directed through the bypass valve starting from a certain hydraulic-fluid inflow or return flow of the servo-cylinder reduces the flow of hydraulic fluid through the bypass valve even at high steering rates, that is, with open bypass valve, due to the series connection of bypass valve and throttling unit so that high servo-assistance is made available at the servo-cylinder.

In a preferred embodiment, the throttling unit comprises a cylinder tube that is closed off on both sides by cylinder heads. The working chamber of this cylinder tube is divided by an axially displaceable piston, whereby the one part is hydraulically connected with the servo-cylinder, preferably by openings disposed in the corresponding cylinder head, and the other part with the steering valve, preferably by openings in the cylinder wall. The piston has at least one orifice type opening in axial direction. The resulting advantage is that in the working chamber of the cylinder tube, due to the flow through the orifice-type opening, a volume-flow-dependent differential pressure is established between the two parts, which causes the piston to shift as a function of the flow direction. The pressure drop at the orifice-type opening thus increases with increasing volume flow.

It is particularly advantageous if one of the two parts of the working chamber of the cylinder tube is hydraulically connected with the bypass valve by at least one control orifice to permit the series connection of the bypass valve and the throttling unit. For this purpose, the part of the working chamber of the cylinder tube that is associated with the steering valve is advantageously hydraulically connected with the bypass valve.

According to one feature of the invention, the flow cross section of the control orifice can be changed by displacing the piston so that the flow of hydraulic fluid through the bypass valve can be throttled as a function of the piston movement and, consequently, as a function of the differential pressure being established in the working chamber of the cylinder tube. According to a further particularly advantageous feature of the invention, the piston is preloaded in a position where the control orifice is open, which permits an axial displacement of the piston only starting from a predetermined pressure difference. For this purpose it is advantageous if the piston is held in a predetermined position by spring elements that engage it on either side and are supported against the cylinder heads since this is a particularly simple and cost effective mechanical implementation.

Advantageously, the piston is guided on a rod whose ends are supported in the cylinder heads to ensure a smooth and non-jamming displacement of the piston. It is furthermore advantageous if the rod is provided with at least one bore by which the control orifice and the bypass valve are hydraulically interconnected, which results in a mechanically favorable functional integration.

According to a further advantageous embodiment of the invention, the bypass valve is made as a proportional valve to provide simple and cost effective integration with the housing of the steering valve and a short response time to the detected speed changes.

Advantageously, the bypass valve has a cylindrical chamber, which is provided with at least one axial and at least one radial opening and within which a slider is guided. To achieve a travelling-speed-dependent throttling of the volume flow through the bypass connection, the slider is advantageously displaceable as a function of the travelling speed.

According to a further development of the invention, the slider is spring-loaded in axial direction to ensure that the bypass valve is in its open position at zero current.

Finally, it is proposed that the cylinder tube of the throttling unit and the chamber of the bypass valve be formed in a housing by one and the same bore.

Further advantages and characteristics of the invention will become evident from the following description of the associated drawing, which depicts two preferred embodiments.

Figure 1:
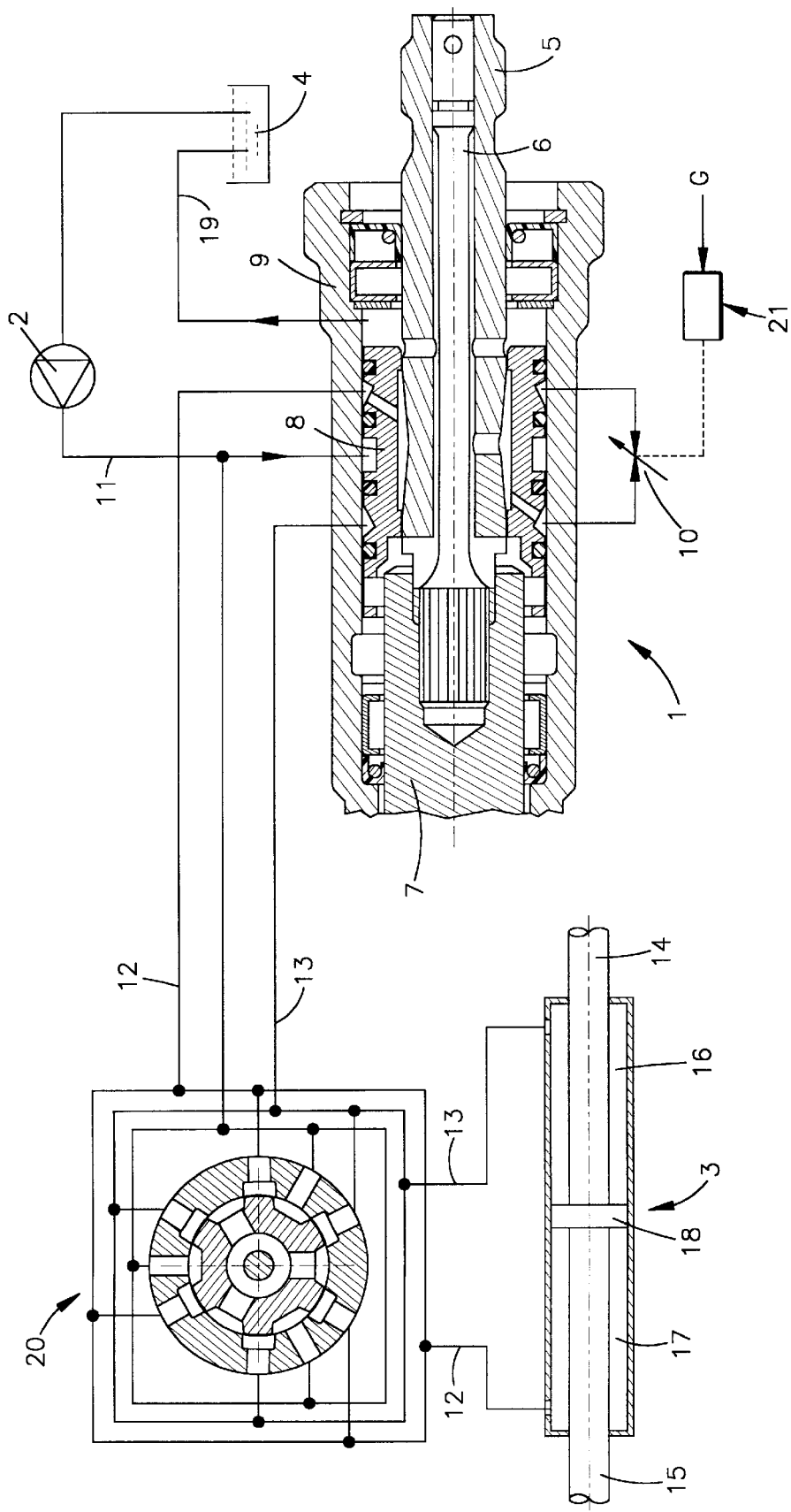
FIG. 1 is a schematic representation of an assisted-power steering unit for the supply of hydraulic fluids to a servo-cylinder as a function of the travelling speed.
Figure 1A:
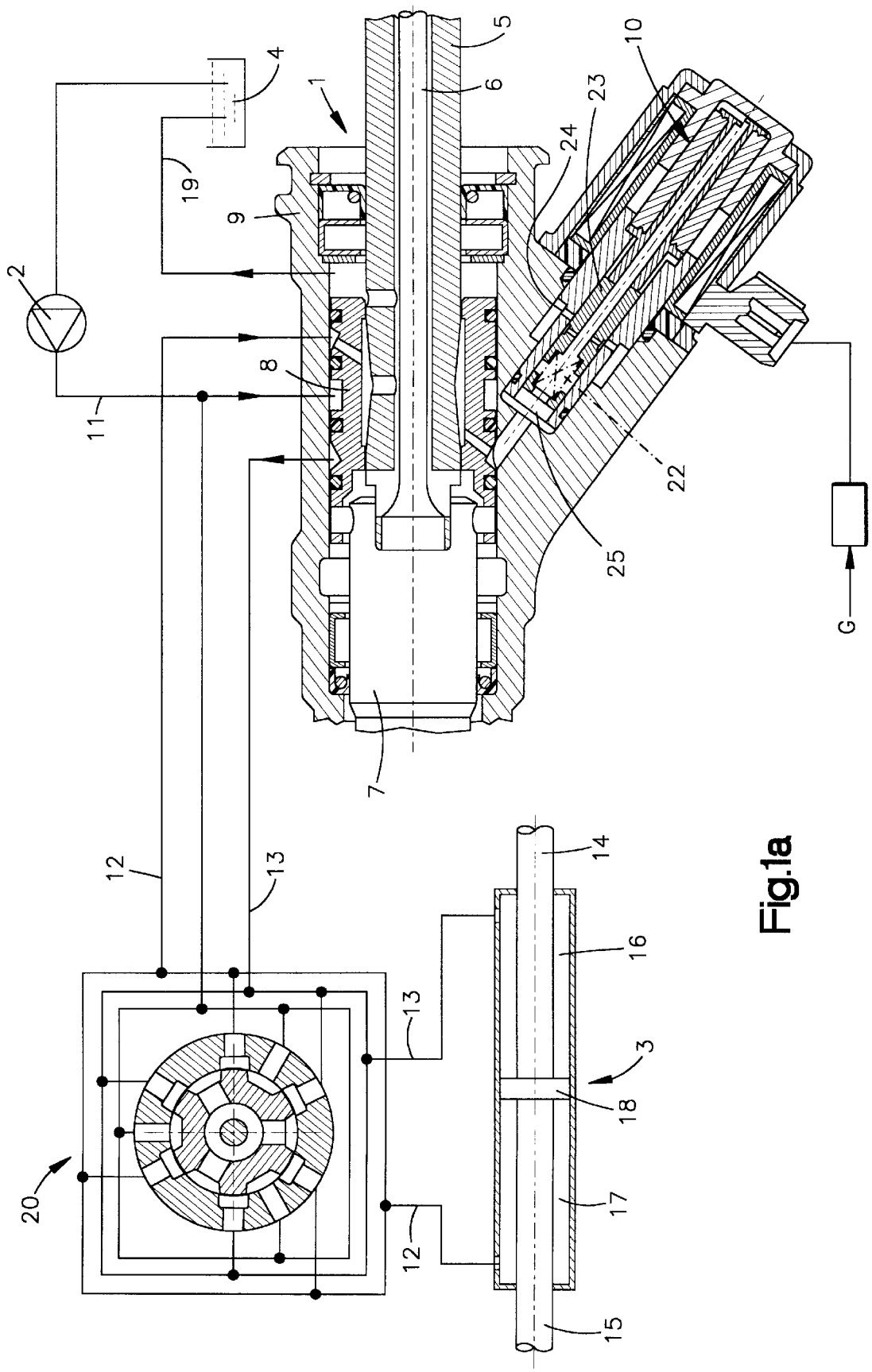
FIG. 1a shows the power-assisted steering unit according to FIG. 1 with a proportional valve integrated in the housing of a steering valve.
Figure 2:
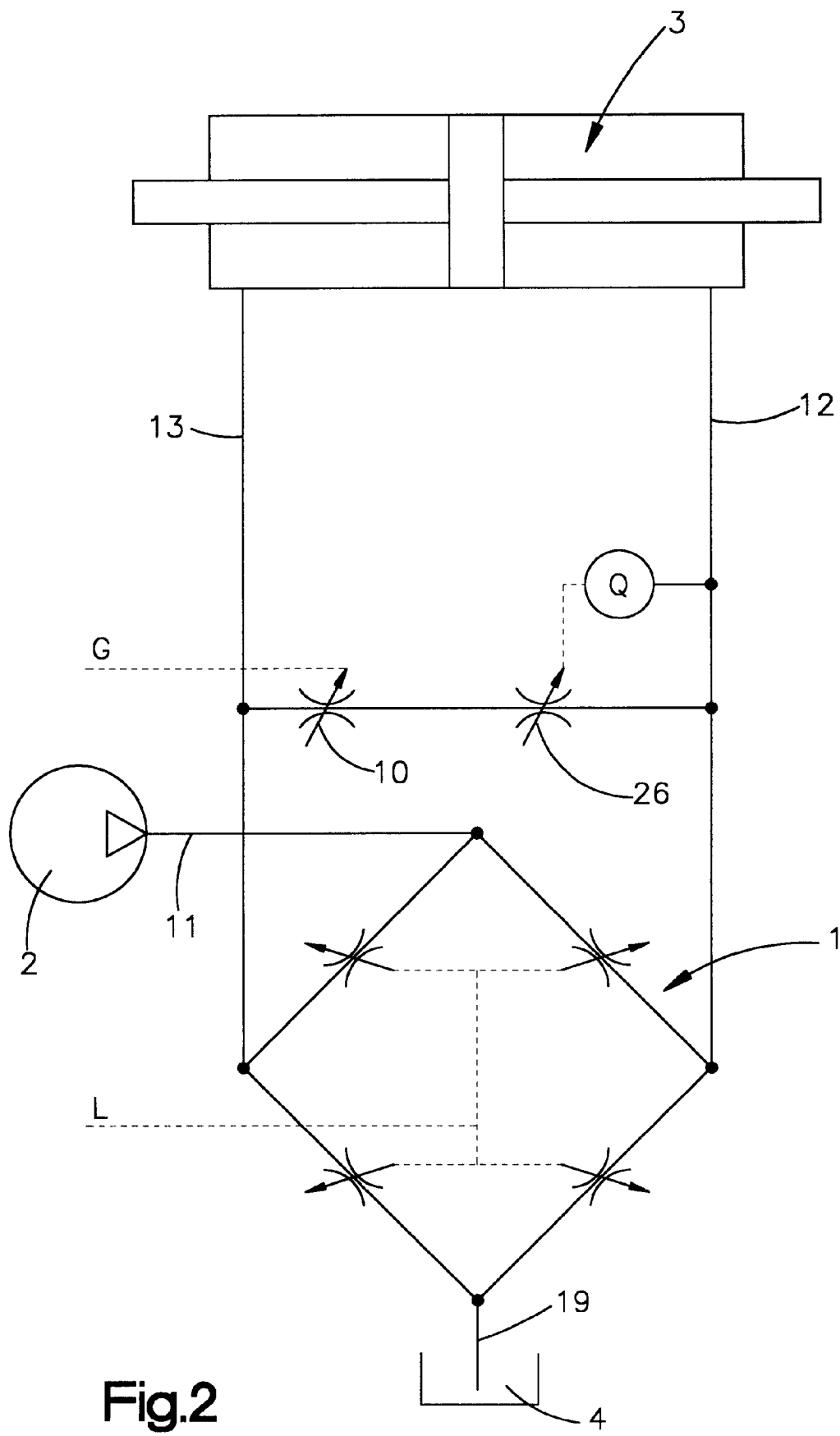
FIG. 2 is a schematic representation of a power-assisted steering unit for the supply of a servo-cylinder with a hydraulic fluid as a function of the travelling speed and the steering rate.

The power-assisted steering unit shown in FIGS. 1 and 1a comprises a steering valve 1 that pressurizes a servo-cylinder 3 with hydraulic fluid from a reservoir 4 via a pump 2. The steering valve 1 comprises an input shaft 5 connected via a torque rod 6 with an output shaft 7. Thus, input shaft 5 and output shaft 7 may be twisted relative to each other at a certain angle of rotation via torque rod 6. The output shaft 7 is non-rotatingly connected with a valve sleeve 8, which is therefore also rotatable with respect to the input shaft 5.

These elements are disposed in a housing 9, which in the embodiment shown in FIG. 1a is furthermore expanded to receive a bypass valve 10.

Hydraulic pressure may be applied to steering valve 1 via a supply line 11. This hydraulic pressure is supplied to servo-cylinder 3 through control grooves or bores made in valve sleeve 8 and input shaft 5 via control lines 12 and 13, depending on the steering direction, to provide servo assistance for the steering motion via piston rods 14, 15 in chambers 16, 17 of servo-cylinder 3. Depending on which chamber 16, 17 of the servo-cylinder 3 is pressurized with hydraulic pressure, piston 18 moves in the direction of the non-pressurized chamber 16, 17 which causes the piston rods 14, 15 to be carried along. The hydraulic fluid displaced in the non-pressurized chamber 16, 17 is returned to reservoir 4 through the corresponding control line 12, 13 and a return line 19.

The functional representation identified by reference number 20 in FIGS. 1 and 1a schematically shows the function of steering valve 1. In the case of an assumed leftward steering angle, for example, a relative torsion occurs between input shaft 5 and valve sleeve 8. This causes the control grooves to open in such a way that the pressure fluid is directed via supply line 11 and control line 13 into chamber 16 of servo-cylinder 3, depicted on the right side of the drawing, and piston 18 moves in the direction of chamber 17. Pump 2 delivering the hydraulic fluid is driven by an electric motor that receives the necessary voltage from a vehicle battery. If the full pumping capacity is not required, for example in standing position, pump 2 can be kept in standby operation in a manner known per se by means of an electronic control unit. The steering valve 1 shown in FIGS. 1 and 1a is designed as an open center steering valve, that is, a continuous flow of hydraulic fluid is maintained even when steering valve 1 is in neutral position. However, the present invention may also be used for closed center steering valves in which the flow of hydraulic fluid is interrupted in neutral position.

The flow of hydraulic fluid provided by pump 2 via supply line 11 as a function of the travelling speed is returned to reservoir 4, bypassing servo-cylinder 3, via bypass valve 10 which in FIG. 1a is implemented as a proportional valve. An electronic control unit 21 is used to convert speed G detected by sensors into corresponding signals for the bypass valve or proportional valve 10. Proportional valve 10, which is controlled in this manner by a magnetic current, is provided with a slider 23 axially loaded by a spring element 22. The displacement motion of slider 23 makes it possible to throttle a radial opening 24 in the cylinder jacket of proportional valve 10. Opening 24 and an additional opening 25 in axial direction of the motion of slider 23 are connected with the control bores in valve sleeve 8 such that, depending on the steering direction, opening 24 serves as inlet opening and opening 25 as outlet opening, respectively opening 25 serves as inlet opening and opening 24 as outlet opening, for the volume flow passing through proportional valve 10. Since, at high travelling speeds, a portion of the hydraulic fluid present at control valve 1 is diverted via the open proportional valve 10, the servo-cylinder 3 is not pressurized with hydraulic fluid, or pressurized only slightly, via control line 12, 13, with the result that servo assistance during the steering motion is reduced. If travelling speed G is reduced, proportional valve 10 closes opening 24 proportionally thereto and the volume flow passing through proportional valve 10 is throttled. If opening 24 is completely closed, there is no volume flow through proportional valve 10 such that servo-cylinder 3 is pressurized with hydraulic fluid to the maximum possible. This ensures that greater servo assistance is provided during parking or at low speeds G while at high speeds servo assistance is reduced to the extent necessary to exclude uncontrollable steering motions.

However, since even at high travelling speeds situations may occur that require a rapid and strong steering angle, for example, in the case of sudden evasive maneuvers, it is appropriate in such exceptional situations to provide high servo assistance. To take this into account, an alternative embodiment of the invention implements the supply with hydraulic fluid of servo-cylinder 3 as a function of the travelling speed and the steering rate such that high servo assistance, that is, a high steering rate, may be achieved even at high travelling speeds. For this purpose, a throttling unit 26 is connected in series with bypass valve 10 to throttle the flow of hydraulic fluid passing through bypass valve 10 as a function of volume flow Q passing through control line 12. This means that at high travelling speeds G and thus open bypass valve 10, the volume flow passing through bypass valve 10 is throttled by throttling unit 26 so that servo-cylinder 3 receives the full hydraulic pressure applied by pump 2 to steering valve 1 for servo assistance. Throttling unit 26 is controlled in such a way as to throttle the bypass connection only on reaching a predetermined steering torque L, which is equivalent to a certain value of the volume flow passing through control lines 12, 13.

Figure 3:
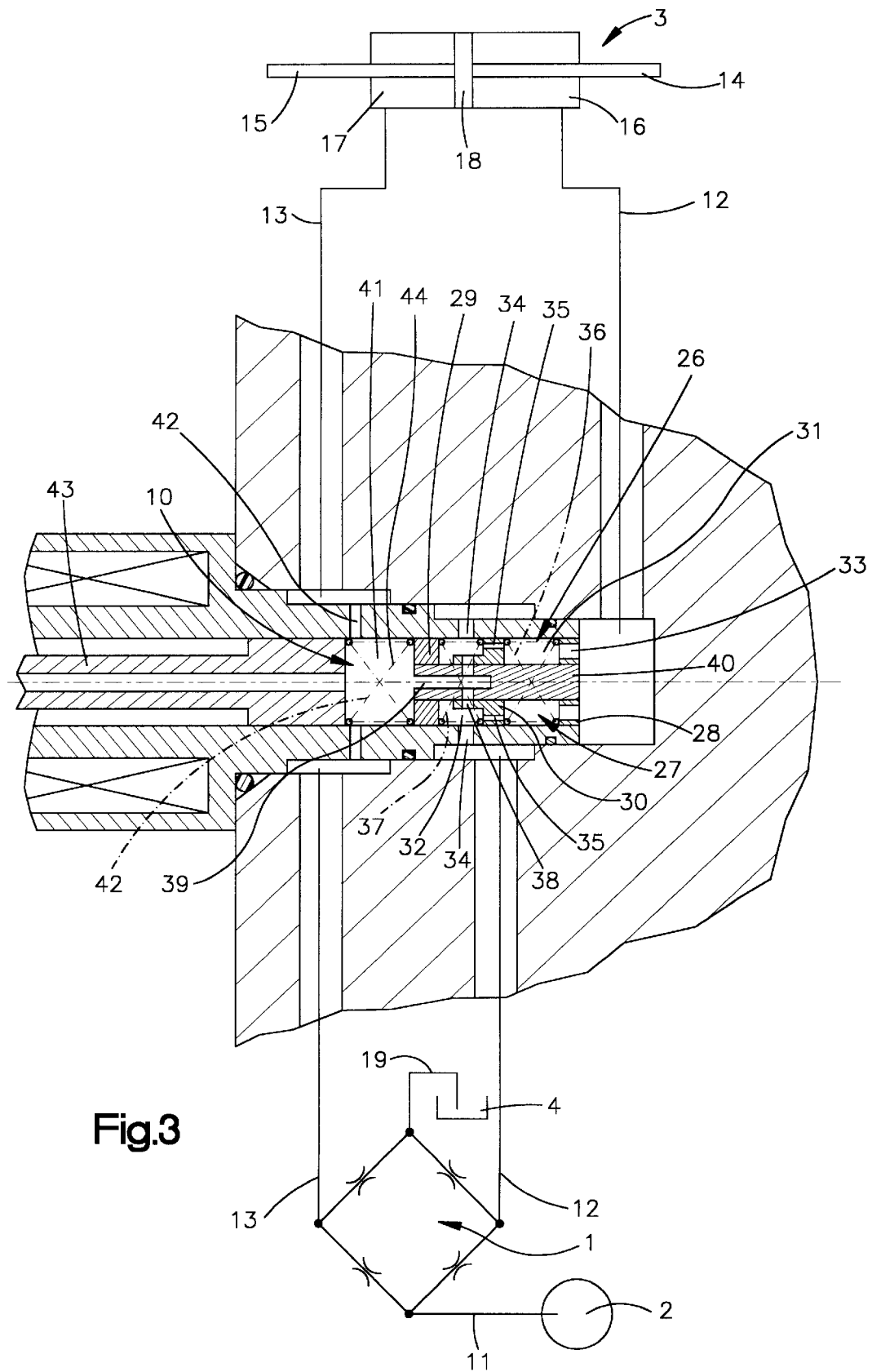
FIG. 3 is a schematic representation of the valve position of the power-assisted steering unit according to FIG. 2 at high travelling speed and low steering rate.
Figure 3A:
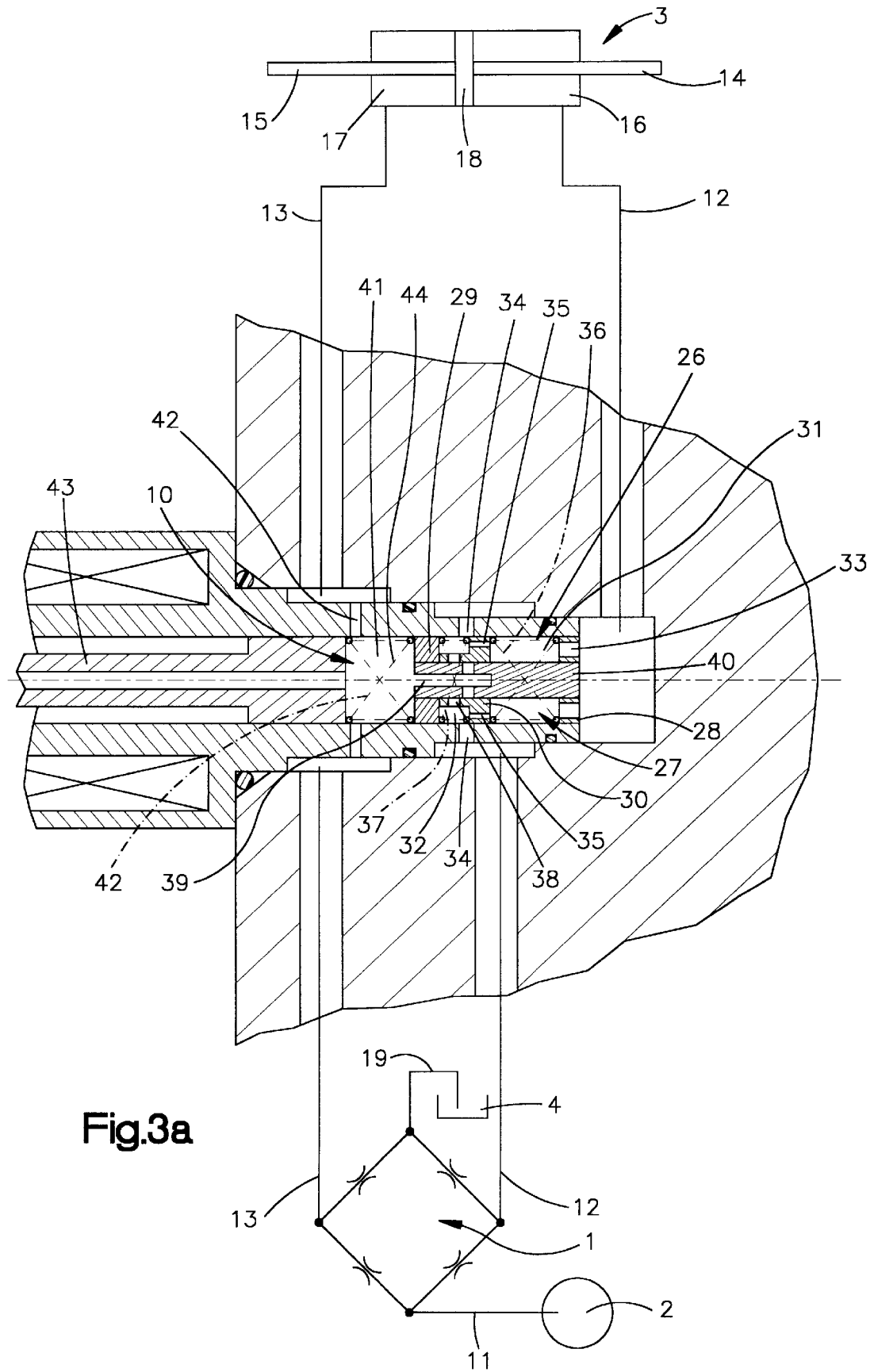
FIG. 3a is a schematic representation of the valve position of the power-assisted steering unit according to FIG. 2 at high travelling speed and high steering rate.

FIGS. 3 and 3a depict the valve positions of throttle unit 26 at high travelling speed and low, respectively high, steering rate. As may be seen, the throttling unit 26 comprises a cylinder tube 27 that is closed off on both sides by cylinder heads 28, 29. The working chamber of cylinder tube 27 is divided into two chambers 31 and 32 by an axially displaceable piston 30. Chamber 31 is hydraulically connected with servo-cylinder 3 via opening 33 and a portion of control line 12. By contrast, chamber 32 is hydraulically connected with steering valve 1 via opening 34 and another portion of control line 12. Piston 30 is provided with orifice openings 35 in axial direction, which permit the hydraulic fluid in control line 12 to flow through cylinder tube 27. On pressurization of chamber 16 of servo-cylinder 3, hydraulic fluid from chamber 31 flows through cylinder tube 27 in the direction of chamber 31 of cylinder tube 27. On pressurization of chamber 17 of servo-cylinder 3, the return flow present at that time in control line 12 flows in the opposite direction to reservoir 4. Due to the flow through the orifice openings 35, a differential pressure is established in chambers 31 and 32 as a function of the quantity of the volume flow. This causes piston 30 to be axially displaced starting from a certain value. Spring elements 36 and 37, which engage piston 30 on either side and are supported against cylinder heads 28 and 29, respectively, preload piston 30 in such a way that piston 30 is axially displaced only if the pressure differential between chamber 31 and 32 exceeds the spring force applied by spring elements 36, 37.

The pressure difference being established in chambers 31 and 32 is proportional to the quantity of the volume flow through cylinder tube 27, which in turn is an indicator for the steering torque generated by the steering motion. Spring elements 36, 37 hold piston 30 in its neutral position in such a way that a hydraulic connection to control line 13 or steering valve 1 is established via a radial control orifice 38, a bore 39 in a rod 40 guiding piston 30 as well as via a chamber 41 and radial bores 42. This hydraulic connection represents the bypass through which a portion of the flow of hydraulic fluid may be directed to bypass the servo-cylinder 3. A slider 43 can change the flow cross section of bores 42 in chamber 41. An electronic control unit 21 controls slider 43 in the above-described manner as a function of the travelling speed. This causes a speed-dependent flow through chamber 41 via bores 39 into cylinder tube 27, or vice versa, to form the bypass connection. The flow direction depends on the respective pressurization of chambers 16, 17 of servo-cylinder 3. A spring element 44 loading the slider 43 in axial direction holds bores 42 open if slider 43 is not actuated.

If, a high steering torque L is applied at high travelling speeds, that is while bores 42 are open and a portion of the hydraulic fluid flows through the bypass connection, then a high volume flow flows through control lines 12, 13 causing a high pressure difference between chambers 31 and 32. The resulting displacement of piston 30 causes a throttling or closing of control orifice 38 such that the flow of hydraulic fluid through the bypass connection is interrupted due to the series connection of bypass valve 10 and throttling unit 26, as shown in FIG. 3a. The hydraulic fluid thus fully pressurizes servo-cylinder 3 so as to achieve a high steering rate even at a high travelling speed.

The power-assisted steering unit according to the invention proposes a simple design to permit the supply of servo-cylinder 3 as a function of travelling speed and steering rate taking into account not only cost effective production but also easy and quick assembly. Furthermore, the volume-flow-dependent pressure difference between the chambers 31 and 32 of throttling unit 26 provides automatic throttling of the bypass volume flow without using complex sensors, which results in particularly high wear resistance.

| Reference Number List | |
|---|---|
| 1 | steering valve |
| 2 | pump |
| 3 | servo-cylinder |
| 4 | reservoir |
| 5 | input shaft |
| 6 | torque rod |
| 7 | output shaft |
| 8 | valve sleeve |
| 9 | housing |
| 10 | bypass valve |
| 11 | supply line |
| 12 | control line |
| 13 | control line |
| 14 | piston rod |
| 15 | piston rod |
| 16 | chamber |
| 17 | chamber |
| 18 | piston |
| 19 | return line |
| 20 | functional representation |
| 21 | electronic control unit |
| 22 | spring element |
| 23 | slider |
| 24 | opening |
| 25 | opening |
| 26 | throttling unit |
| 27 | cylinder tube |
| 28 | cylinder head |
| 29 | cylinder head |
| 30 | piston |
| 31 | chamber |
| 32 | chamber |
| 33 | opening |
| 34 | opening |
| 35 | orifice opening |
| 36 | spring element |
| 37 | spring element |
| 38 | control orifice |
| 39 | bore |

| -continued | |
|---|---|
| Reference Number List | |
| 40 | rod |
| 41 | chamber |
| 42 | bore |
| 43 | slider |
| 44 | spring element |
| G | speed |
| Q | volume flow |
| L | steering torque |

What is claimed is:

1. An assisted-power steering unit for a motor vehicle wherein power assistance is dependent upon the vehicle's speed and rate of steering, the unit comprising:
   a servo-cylinder (3) having two chambers (16, 17);
   a steering valve (1) for directing pressurized hydraulic fluid from a pump (2) to the respective chambers (16, 17) of the servo-cylinder (3) when there is steering movement;
   a bypass valve (10) being connected in parallel with the servo-cylinder (3), the bypass valve (10) providing means for controlling a portion of the hydraulic fluid that bypasses the servo-cylinder (3); and
   a throttle unit (26) being connected in series with the bypass valve (10), the throttle unit (26) automatically throttling hydraulic fluid flow directed through the bypass valve (10) after a predetermined hydraulic fluid flow through the bypass valve (10) is reached, the throttle unit (26) having a cylinder tube (27) that is closed by cylinder heads (28, 29) to form a working chamber, the working chamber being divided into two parts by an axially displaceable piston (30) whereby a first part (31) is hydraulically connected with the servo-cylinder (3) by openings (33) arranged in a corresponding cylinder head (28) and a second part (32) is connected with the steering valve (1) by openings (34) in the wall of the cylinder tube (27), and whereby the piston (30) is provided with at least one orifice type opening (35) in an axial direction.

2. The assisted-power steering unit according to claim 1 wherein one of the two parts (31, 32) of the working chamber of the cylinder tube (27) is hydraulically connected with the bypass valve (10) via at least one control orifice (38).

3. The assisted-power steering unit according to claim 2 wherein the second part (32) of the working chamber of the cylinder tube (27) is hydraulically connected with the bypass valve (10).

4. The assisted-power steering unit according to claim 2 wherein a flow cross section of the control orifice (38) can be changed by displacement of the piston (30).

5. The assisted-power steering unit according to claim 2 wherein the piston (30) is preloaded in a position where the control orifice (38) is open.

6. The assisted-power steering unit according to claim 5 wherein the piston (30) is held in a predetermined position by spring elements (36, 37) that engage the piston (30) on either side and that are supported against the cylinder heads (28, 29).

7. The assisted-power steering unit according to claim 1 wherein the piston (30) is guided on a rod (40) having two ends, the ends of the rod being supported in the cylinder heads (28, 29).

8. The assisted-power steering unit according to claim 7 wherein the rod (40) is provided with at least one bore (39)

that hydraulically connects a control orifice (38) and the bypass valve (10).

9. The assisted-power steering unit according to claim 1 wherein the bypass valve (10) is designed as a proportional valve.

10. The assisted-power steering unit according to claim 1 wherein the bypass valve (10) is integrated in a housing of the steering valve (1).

11. The assisted-power steering unit according to claim 9 wherein the bypass valve (10) comprises a cylindrical chamber (41), the cylindrical chamber (41) being provided with at least one axial opening (39) and at least one radial opening (42), a slider (43) being guided in the cylindrical chamber (41).

12. The assisted-power steering unit according to claim 11 wherein the slider (43) is displaceable as a function of the traveling speed.

13. The assisted-power steering unit according to claim 11 wherein the slider (43) is spring loaded in an axial direction by a spring element (44).

14. The assisted-power steering unit according to claim 11 wherein the cylinder tube (27) of the throttling unit (26) and the cylindrical chamber (41) of the bypass valve (10) are formed in a housing (9) by a common bore.

* * * * *

UNITED STATES PATENT AND TRADEMARK OFFICE
CERTIFICATE OF CORRECTION

PATENT NO. : 6,148,947
DATED : November 21, 2000
INVENTOR(S) : Eugen Eberhart, Lars Hampe It is certified that error appears in the above-indentified patent and that said Letters Patent is hereby corrected as shown below:

Column 8, page 10, line 54, change "2" to "4"

Signed and Sealed this

Twenty-ninth Day of May, 2001

Attest:

NICHOLAS P. GODICI

*Attesting Officer*   *Acting Director of the United States Patent and Trademark Office*